July 30, 1935.  G. R. GOIN ET AL  2,009,548
TRAILER
Filed Aug. 5, 1933   2 Sheets-Sheet 1
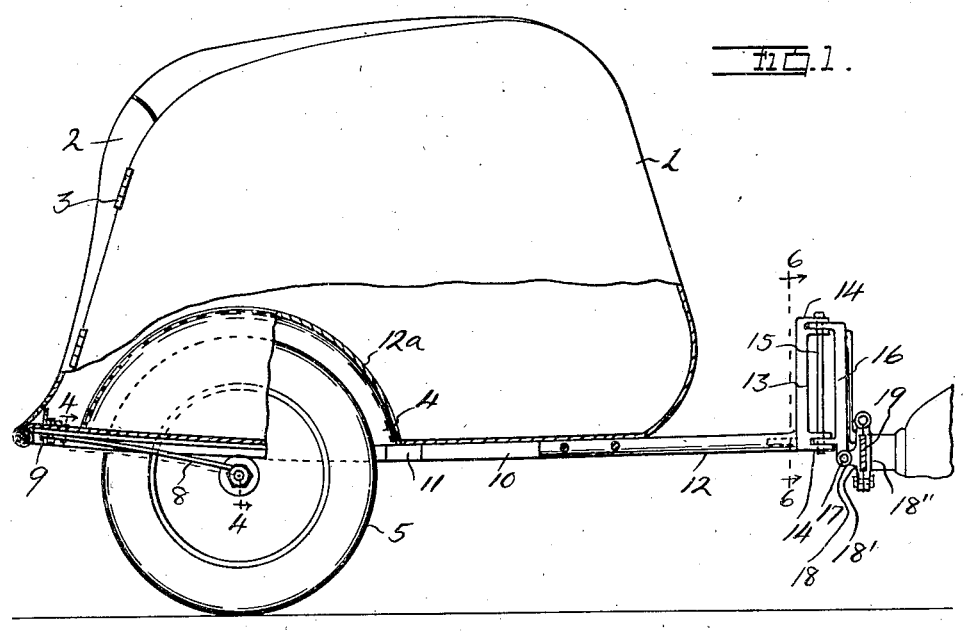
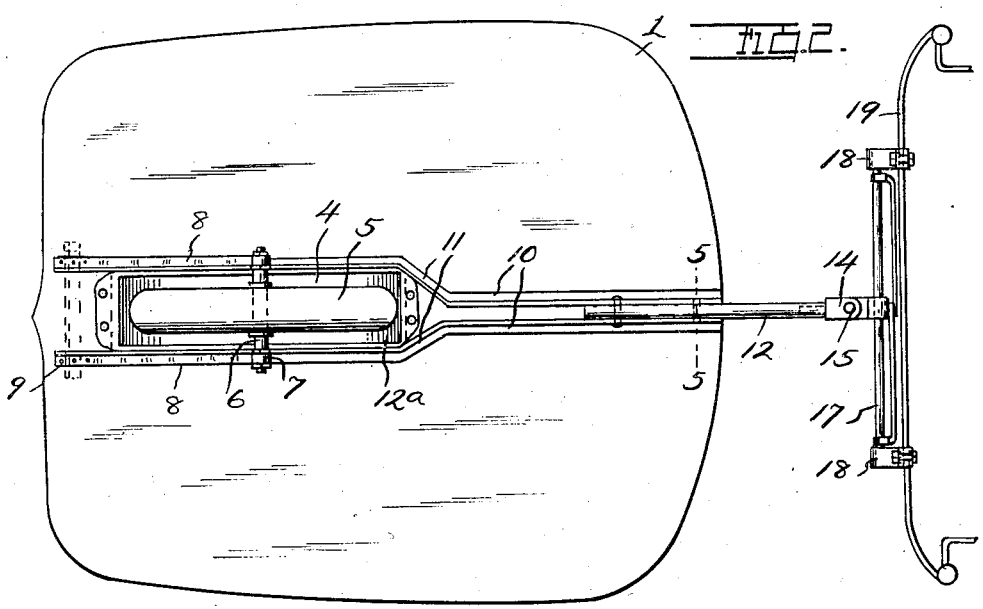
INVENTORS
George R. Goin
Bruno A. DePolo
BY
J. S. Murray
ATTORNEY July 30, 1935.  G. R. GOIN ET AL  2,009,548
TRAILER
Filed Aug. 5, 1933   2 Sheets-Sheet 2
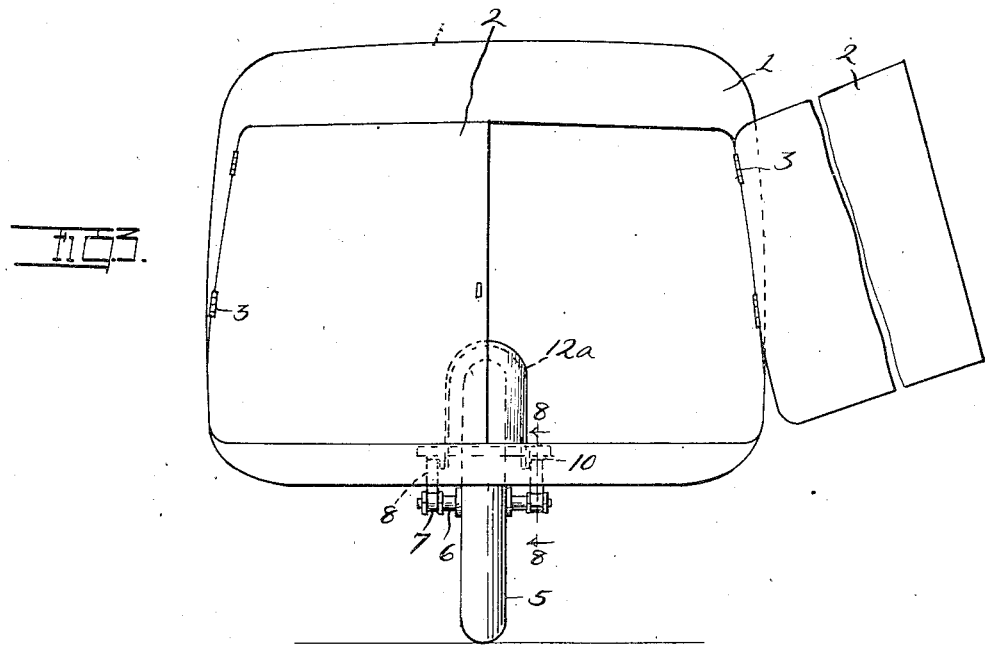
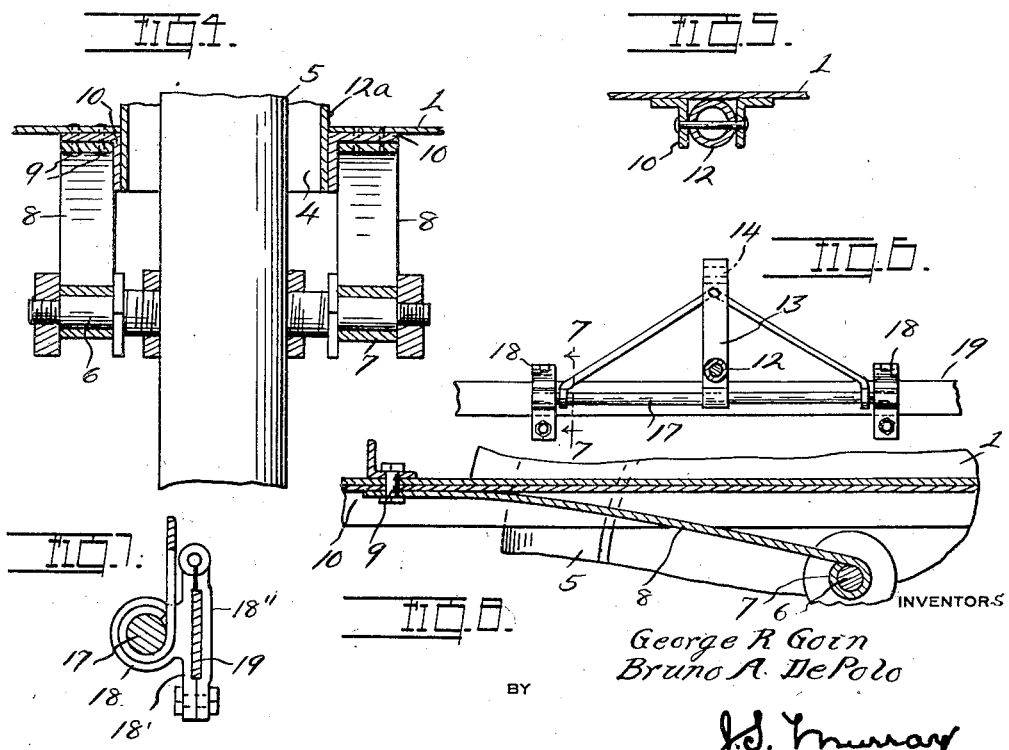
INVENTORS
George R Goin
Bruno A. DePolo
BY
J. S. Murray
ATTORNEY Patented July 30, 1935

2,009,548

UNITED STATES PATENT OFFICE 2,009,548

TRAILER

George R. Goin and Bruno A. De Polo, Detroit, Mich.

Application August 5, 1933, Serial No. 683,744

3 Claims. (Cl. 280—33.4)

This invention relates to trailers and particularly light trailers for camping or commercial purposes.

An object of the invention is to mount a light trailer upon a single road wheel, employing a simple and novel spring suspension.

Another object is to provide a draw bar mechanism for a trailer, particularly adapted for connection to a bumper bar or bars of a draft vehicle.

A further object is to provide a trailer body with a top, floor, front and side walls of imperforate character and to give access to said body only through a rear opening thereof, normally closed by doors adapted to exclude dust.

These and various other objects, the invention attains by the construction hereinafter described and illustrated in the accompanying drawings, wherein:

Fig. 1 is a view of the trailer in central, longitudinal, vertical section.

Fig. 2 is a bottom view of the trailer.

Fig. 3 is a rear view of the trailer showing one of its doors open.

Fig. 4 is a fragmentary cross section taken on the line 4—4 of Fig. 1, showing features of the spring suspension.

Fig. 5 is a sectional detail taken on the line 5—5 of Fig. 2, showing the connection of a draw bar to the trailer.

Fig. 6 is a view of the draft arrangement, taken on the line 6—6 of Fig. 1.

Fig. 7 is a sectional detail of said connection taken on the line 7—7 of Fig. 6.

Fig. 8 is a fragmentary vertical sectional view of the spring suspension, taken upon the line 8—8 of Fig. 3.

In these views, the reference character 1 designates a stream-lined body, formed preferably of sheet-metal, its top, floor, and front and side walls being preferably imperforate. Access to said body is had through the rear end thereof, which is equipped with a pair of doors 2. These are hinged as indicated at 3 at opposite margins of the door opening, the hinge axes having a slight rearward inclination from top to bottom, whereby the doors tend to assume and maintain either their fully opened or fully closed positions. Said doors are adapted to seat tightly, completely excluding dust from the body, in transit.

Midway between the side walls of the body, the rear portion of the floor is formed with an opening 4 accommodating a ground wheel 5, having its central plane of rotation substantially in the longitudinal central plane of the body. Said wheel is journaled on an axle 6, having its extremities rigidly secured in eyelets 7 formed by the front ends of a pair of leaf springs 8. The latter extend lengthwise of the trailer at opposite sides of said wheel, and the rear end of the body is rigidly mounted on the rear ends of said springs, as indicated at 9.

The floor of the trailer is reinforced by a pair of angle bars 10, which extend substantially the full length of said floor therebeneath, the rear portions of said bars being marginal to the opening 4. Said bars are offset at 11 to extend in relatively close parallelism forwardly of said opening, and between their forward ends is fitted a draw bar 12 which is welded or otherwise rigidly secured to said bars. A housing 12a for the wheel 5 rises from the floor marginally of the opening 4, and, preferably is secured to the angle bars 10.

The draw bar 12 rigidly carries at its front end a draft member 13, formed with a pair of vertically spaced bearings 14. In the latter is vertically mounted a pin 15 which swivels a second draft member 16 formed with a bar 17 laterally projecting at each side of the draw bar. Upon the extremities of the bar 17 is swiveled a pair of fittings 18 each comprising a pair of complementary clamping jaws 18' and 18" for embracing a rear bumper bar 19 of an automobile or other draft vehicle.

By thus adapting the trailer for attachment to a rear bumper rather than a rear axle, the risk of subjecting such axle to undue draft strains is avoided.

It will be noted that the vertical and horizontal swivel connections established by the pin 15 and bar 17 jointly secure the effect of a universal joint, permitting any required angular variation in the draft relation of the pulling vehicle (not shown) and trailer. It is also to be noted that the described type of draft connection is particularly suited to a single wheel type of trailer.

The described trailer, because of its use of only one road wheel and the simplicity of all its structural features may be produced in quantities at relatively low cost. It is well adapted for hauling light loads of any character, as well as for camping purposes and may be furnished with beds, if desired.

It is to be understood that the form of this invention herewith shown and described is to be taken as a preferred example of the same and that certain changes in the shape, size and arrangement of the parts may be made without departing from the spirit of this invention or the scope of the subjoined claims.

What I claim is:

1. A trailer comprising a body having a floor and side walls and an opening in the floor substantially mid-way between the walls, a pair of leaf springs attached at corresponding ends to the floor at each side of said opening, and extending longitudinally of the vehicle at a downward divergence to the floor, and a wheel rotatively carried by the other ends of said springs in said floor opening and maintained by said springs with its plane of rotation substantially in the mid plane of the vehicle body.

2. A trailer comprising a body having a floor and having an opening in said floor, substantially midway between the lateral margins of the floor, a wheel positioned in said opening, a pair of frame members extending beneath the floor lengthwise of the body, at opposite margins of said opening, and having forward portions spaced to accommodate and carry a draw bar between said portions, and means for rotatively mounting said wheel on said frame members.

3. In a trailer as set forth in claim 2, the last-mentioned means comprising a pair of springs elongated approximately lengthwise of the vehicle and mounted at corresponding ends upon said frame members, and supported on and journaling said wheel at their other ends.

GEORGE R. GOIN.
BRUNO A. DE POLO.